United States Patent
Akiyama

(10) Patent No.: US 9,098,184 B2
(45) Date of Patent: Aug. 4, 2015

(54) INFORMATION PROCESSING APPARATUS, INFORMATION PROCESSING METHOD AND MEDIUM FOR STORING INFORMATION PROCESSING PROGRAM

(75) Inventor: Katsuhiko Akiyama, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 13/326,430

(22) Filed: Dec. 15, 2011

(65) Prior Publication Data

US 2012/0176324 A1 Jul. 12, 2012

(30) Foreign Application Priority Data

Jan. 6, 2011 (JP) ................................. 2011-001402

(51) Int. Cl.
*G06F 3/033* (2013.01)
*G06F 3/0488* (2013.01)

(52) U.S. Cl.
CPC .......... *G06F 3/0488* (2013.01); *G06F 3/04883* (2013.01); *G06F 3/04886* (2013.01)

(58) Field of Classification Search
CPC ......................... G06F 3/04883; G06F 3/04886
USPC .................... 345/156–173; 715/773
See application file for complete search history.

(56) References Cited

U.S. PATENT DOCUMENTS

| 8,667,414 B2 * | 3/2014 | Zhai et al. ..................... 715/773 |
| 2006/0274944 A1 * | 12/2006 | Tanaka et al. ................. 382/186 |
| 2010/0188409 A1 * | 7/2010 | Ooba ............................ 345/473 |
| 2010/0257478 A1 * | 10/2010 | Longe et al. .................. 715/773 |
| 2013/0135209 A1 * | 5/2013 | Zhai et al. ..................... 345/168 |

FOREIGN PATENT DOCUMENTS

| JP | 9-198190 | 7/1997 |
| JP | 9-319502 | 12/1997 |
| JP | 11-126121 | 5/1999 |
| JP | 11-305896 | 11/1999 |
| JP | 2005-85242 | 3/2005 |
| JP | 2005/085242 A * | 3/2005 ............... G06K 9/62 |
| JP | 2005-92538 | 4/2005 |
| JP | 2008-233483 | 10/2008 |

* cited by examiner

*Primary Examiner* — Kent Chang
*Assistant Examiner* — Nelson Rosario
(74) *Attorney, Agent, or Firm* — Staas & Halsey LLP

(57) ABSTRACT

An information processing apparatus includes a processor which executes a process including receiving position information of a plurality of touch points on a screen, displaying a plurality of operation areas to be touched on the screen, calculating a length of a stroke including the touch points on a basis of the position information received in the receiving, measuring a time period for drawing the stroke including the touch points on a basis of the position information received in the receiving, setting a threshold value on a basis of relationship information, and comparing one of the time period measured in the measuring and the length of the stroke calculated in the calculating with the threshold value set in the setting to determine whether the position information received in the receiving is input by a handwriting or by a touch operation on the operation areas in accordance with a comparison result.

20 Claims, 12 Drawing Sheets

FIG. 11
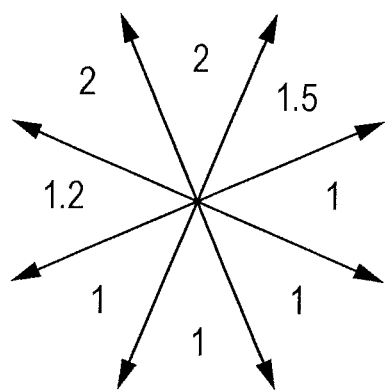
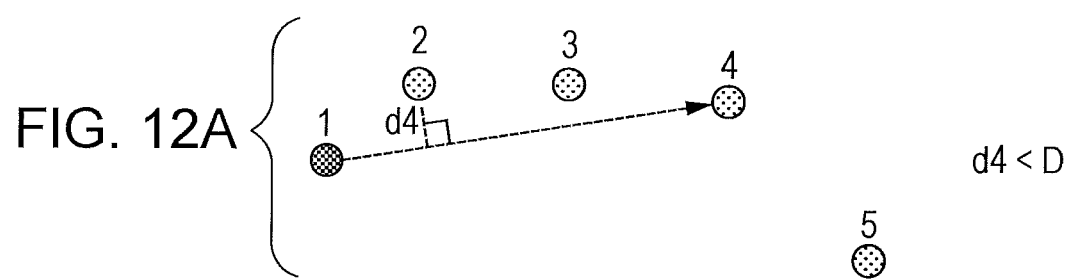
FIG. 12A
d4 < D
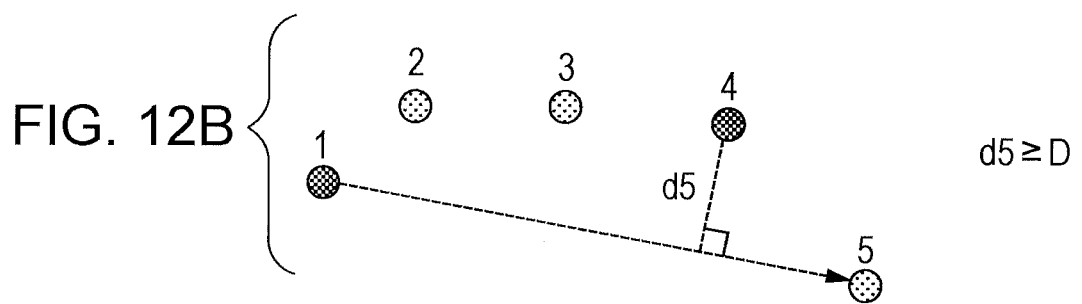
FIG. 12B
d5 ≥ D

INFORMATION PROCESSING APPARATUS, INFORMATION PROCESSING METHOD AND MEDIUM FOR STORING INFORMATION PROCESSING PROGRAM

CROSS-REFERENCE TO RELATED APPLICATIONS

This application is based upon and claims the benefit of priority of the prior Japanese Patent Application No. 2011-1402, filed on Jan. 6, 2011, the entire contents of which are incorporated herein by reference.

FIELD

The embodiment discussed herein is related to an information processing apparatus, an information processing method and a medium for storing an information processing program.

BACKGROUND

It has been necessary for a user to select an input mode of an information processing apparatus functioning in a handwritten input mode or a software keyboard input mode. A coordinate input display and two types of display with a touch panel have been proposed as displays using a technique that allows users to draw a line by a hand on a software keyboard.

The coordinate input display determines which input mode is selected, on the basis whether or not a start point and an end point of a stroke are within a same key region on a software keyboard.

The first type display with touch panel detects the selected input mode based on the length of a line from a start point to an end point.

The second type display with touch panel detects the selected input mode based on the time period during which a contact point stays at a same position.

Japanese Laid-open Patent Publications Nos. 9-319502, 2005-92538 and 2005-85242 are examples of related art.

The coordinate input display, however, has such a problem that since a small line, or stroke, is often written inside a same key region, it may be difficult to identify a small dot and punctuation mark as handwritten input in some cases. The coordinate input display also has such a problem that when touching is made in the vicinity of a boundary between adjacent keys, it may be erroneously detected as a handwritten stroke if the stroke slightly runs off.

The first type display with touch panel has such a problem that if a user unintentionally brushes some keys with a finger while quickly touching keys, stroke length may be recognized to be longer and the apparatus may falsely set to the input mode.

The second type display with touch panel has such a problem that since a user is requested to stop an operation, a wait time is needed.

SUMMARY

According to an aspect of the invention, an information processing apparatus includes a memory which stores relationship information between a length of a stroke including a plurality of touch points on a screen of a display and a time period for drawing the stroke, and a processor which executes a process including receiving position information of a plurality of touch points detected on the screen, displaying a plurality of operation areas to be touched on the screen, calculating a length of a stroke including the touch points detected on the screen on a basis of the position information received in the receiving, measuring a time period for drawing the stroke including the touch points detected on the screen on a basis of the position information received in the receiving, setting a threshold value on a basis of the relationship information stored in the memory, and comparing one of the time period measured in the measuring and the length of the stroke calculated in the calculating with the threshold value set in the setting to determine whether the position information received in the receiving is input by a handwriting or by a touch operation on the operation areas in accordance with a comparison result.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 11 is a diagram illustrating vectors quantized in their length;

FIG. 12A and FIG. 12B are diagrams for describing a method of extracting characteristic points;

DESCRIPTION OF EMBODIMENT

Next, preferred embodiments will be described in detail.

Figure 1:
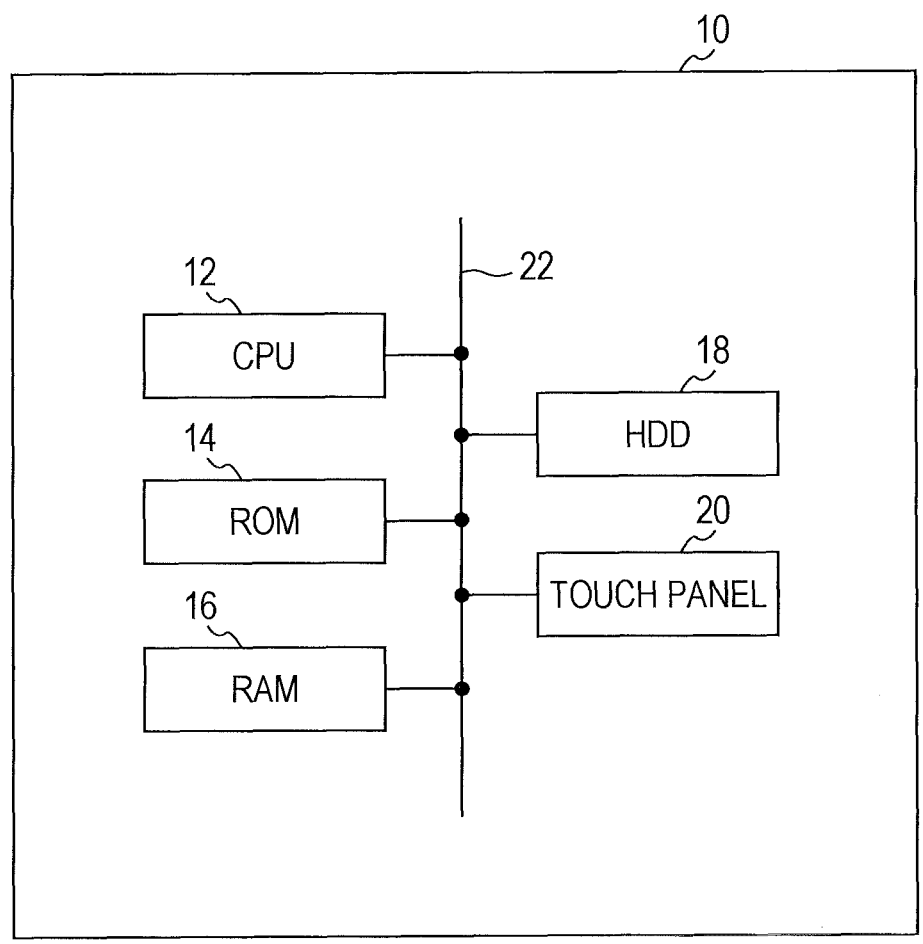
FIG. 1 is a schematic diagram illustrating a configuration of an information processing apparatus according to a first embodiment.

A portable-type information processing apparatus 10 includes a CPU 12, a ROM 14, a RAM 16, an HDD 18, a touch panel display 20, and a bus 22 that connects them with one another, as illustrated in FIG. 1. The information processing apparatus 10 is, for example, a cell phone, a smart phone, a PDA (Portable Digital Assistant), or a small PC (Personal Computer).

The CPU 12 executes various programs. Various programs and parameters are stored in the ROM 14. The RAM 16 is used as a work area or the like in execution of various programs by the CPU 12. Various data and programs on printing etc., which will be described later, are stored in the HDD 18.

The touch panel display 20 has a display board and a transmission touch panel disposed on the board. Various kinds of information are displayed on a screen of the apparatus, and a user touches the touch panel to input data or command.

The touch panel display 20 uses, for example, an analog resistance film system. This film system includes an upper film and a lower film, and both of films have a wiring pattern printed thereon for identify X-coordinate and Y-coordinate of the touched position. The touch panel display 20 is one example of the display.

Figure 2:
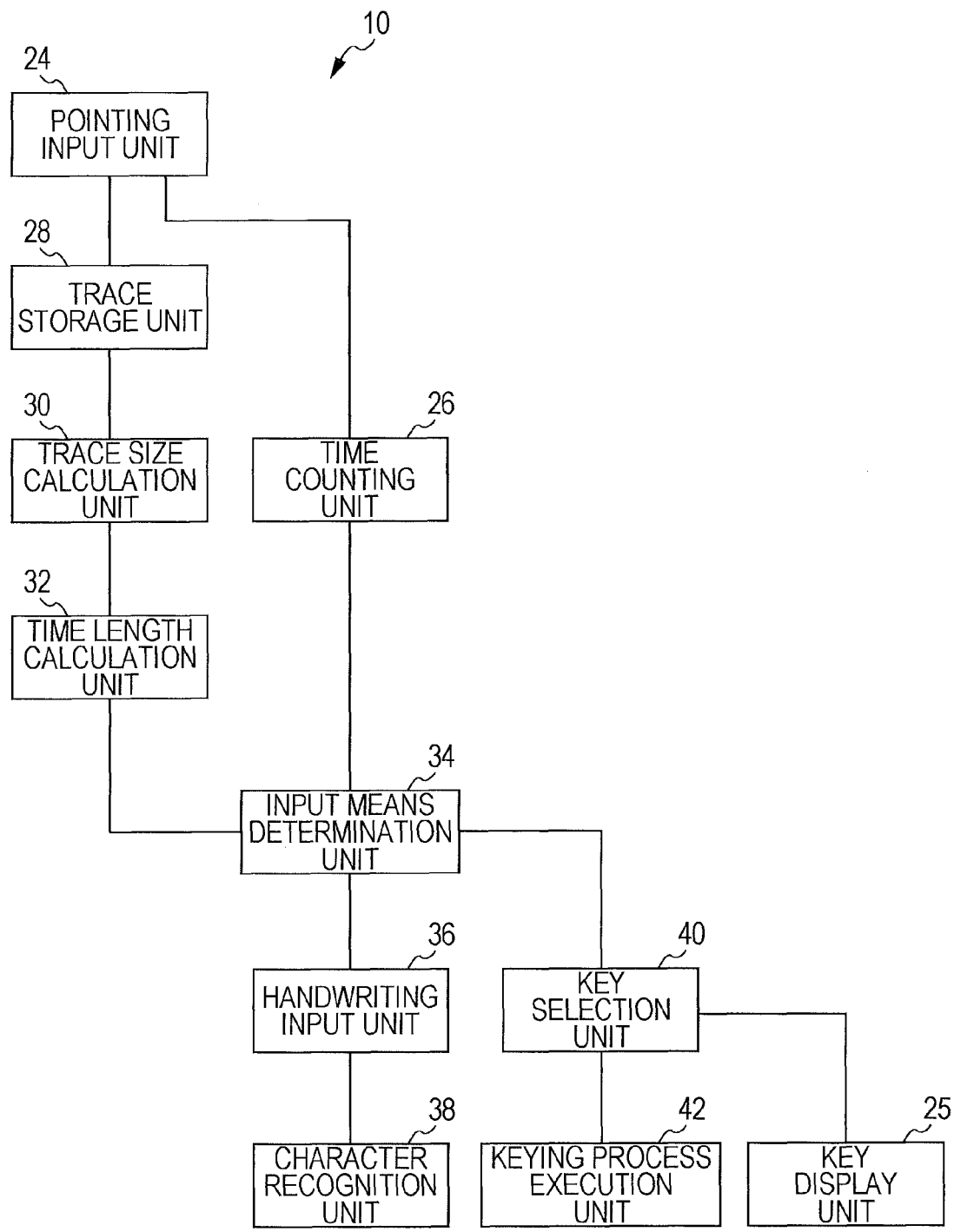
FIG. 2 is a functional block diagram of the information processing apparatus according to the first embodiment.

FIG. 2 is a functional block diagram of the information processing apparatus 10. The information processing apparatus 10 includes a pointing input unit 24, a keyboard image generator 25, a timer 26, a stroke image memory 28, a stroke length calculator 30, a time period calculator 32, and an input mode determination unit 34 as illustrated in FIG. 2. The pointing input unit 24 is an example of an input accepting unit, the keyboard image generator 25 is an example of a display control unit. The time period calculator 32 is an example of a threshold value calculation unit.

The pointing input unit 24 identifies a position being touched on the touch panel display 20. For example, when a user touches the touch panel display 20, the upper and lower films of the resistance film system are brought into contact with each other and the pointing input unit 24 identifies the coordinates (X-coordinate, Y-coordinate) of a position, to which the user touches, on the basis of voltage values measured at ends of the film system of the touch panel display 20.

The pointing input unit 24 sends the data on the identified coordinates of the touched position to the stroke image memory 28.

In addition, the pointing input unit 24 identifies coordinates of a continuous line from a touching point to a releasing point on the touch panel display 20. Further, the pointing input unit 24 notifies the timer 26 that input operation has been started since the touching on the touch panel display 20.

Figure 3:
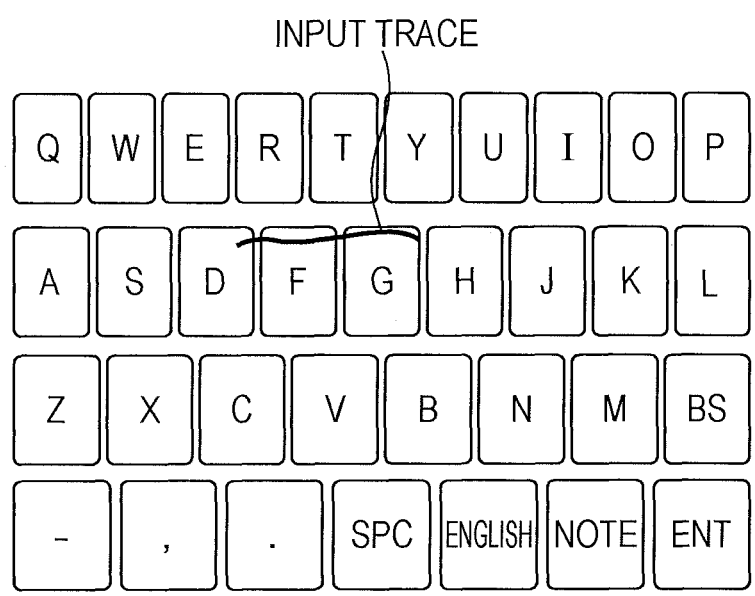
FIG. 3 is a software keyboard displayed on a touch panel.

The keyboard image generator 25 displays a software keyboard with alphabet key icons on the touch panel display 20 as illustrated in FIG. 3. Incidentally, shape, size, and type of the software keyboard are not limited. Thus, each key icon may have a square form or any of other specific forms such as an elongated form or an elongated and curved form. In the embodiment, a general case in which each key icon is square and the icons are arrayed in the familiar QWERTY layout will be described. The plurality of key icons is an example of a plurality of operation areas.

The timer 26 starts measurement of elapsed time upon receiving notification from the pointing input unit 24. The notification indicates that the pointing input unit has detected a touching on the touch panel display 20. Through the measurement, a time period of writing of a stroke on the touch panel display 20 is determined.

The stroke image memory 28 receives coordinate data etc. from the pointing input unit 24 and stores at least the coordinate data of a start point and an end point in time series. When the start point of the next input has been output from the pointing input unit 24, coordinate information previously stored in the stroke image memory 28 may be deleted.

The stroke length calculator 30 calculates the length of the stroke using the coordinate data stored in the stroke image memory 28. For example, the stroke length calculator 30 calculates a distance between adjacent coordinate points, repeats the calculation, and finally adds up those distances to determine the total length of the stroke.

The time period calculator 32 calculates the minimum time period for drawing the stroke, whose length is calculated by the stroke length calculator 30, on the basis of an obtained relationship between the length of the stroke and the minimum time period of writing. The calculated minimum time is used as the threshold value.

The relationship between the length of a stroke and a time period of writing is obtained as follows:

First, a user writes many characters, etc. by handwriting on the touch display panel 20. A stoke on the software keyboard is illustrated in FIG. 3. The information processing apparatus 10 measures a time period to draw a stroke and stores the data. The information processing apparatus 10 calculates the minimum values of the time period for each length of the strokes on the basis of the stored data. Examples of measured values are listed below in Table. Even if the data of a stroke having a length of one pixel cannot be obtained, in order to estimate a threshold value of the time period for drawing the stroke having a length of one pixel, it is preferable that the threshold value be set to zero when no stroke is drawn.

TABLE

| LENGTH OF STROKE | MINIMUM TIME FOR WRITING |
| --- | --- |
| 0 | 0 |
| 3 | 12 |
| 5 | 17 |
| 7 | 19 |
| 10 | 22 |
| 13 | 25 |
| 15 | 28 |
| 19 | 31 |
| 23 | 35 |
| 26 | 40 |
| 27 | 41 |

Figure 4:
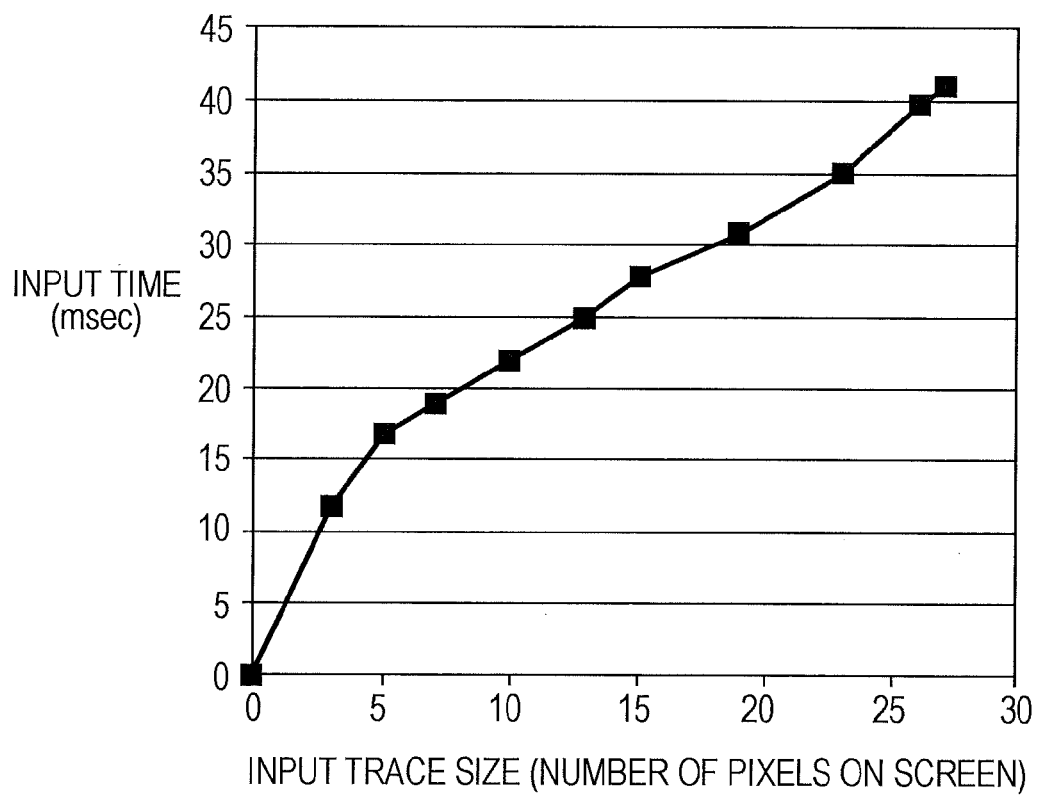
FIG. 4 is a graph illustrating a relationship between the length of a stroke and the minimum time period of writing.

When the sufficient number of samples is not obtained, the measured values are discretely obtained. Thus, the information processing apparatus 10 uses a linear interpolation method to obtain a continuous curve, which represents a relationship between the length of a stroke and the minimum time period of writing. The linear interpolation is conducted, as illustrated in FIG. 4, by connecting adjacent plots.

When a length data obtained by the stroke length calculator 30 is larger than the maximum value (the maximum value among values measured in advance), the time period calculator 32 uses a time data corresponding to the stroke having the maximum length. If a given stroke that is far longer than that of actually measured in advance, since there is an enough time to determine whether the current input mode is a software keyboard input mode or a handwritten input mode, the threshold value to be used as a minimum time period to write the given stroke may be erroneous to some extent. Thus, even when a given stroke is longer than the maximum measured length, erroneous determination may not be made as long as the maximum measured length data is used as the threshold value. For example, in the case that the maximum measured length is 50 pixels and the minimum input time period corresponding to the length is 0.4 sec, when the given length is 80 pixels, the time period calculator 32 uses 0.4 sec as the minimum input time period.

When a length calculated by the stroke length calculator 30 is longer than the maximum length stored in advance by a predetermined value, the time period calculator 32 may calculate a very small value (for example, 0 (zero)) as the minimum input time period corresponding to the calculated length. As a result, a significantly long stroke, which cannot be a running off of a finger, is typically determined to be a handwritten input.

In addition, the input mode determination unit 34 determines whether the input time period counted by the timer 26 is longer than a threshold value, which is calculated by a time period calculator 32, and determines whether the input is done under a handwritten input mode or a software keyboard input mode.

It takes longer time for a user to write characters than the minimum time calculated based on the length of a stroke. Therefore, the input mode determination unit 34 determines that handwritten input has been performed when an input time period is equal to or longer than that of the threshold value of the minimum input time period, while key entry has been performed when an input time period is shorter than that of the threshold value.

Figure 5A:
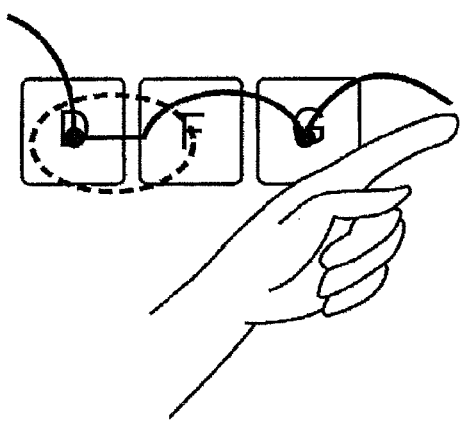
FIG. 5A is a path of a finger that slightly runs off at a key "D" in a software keyboard input mode.

When a finger runs off from a key icon in a software keyboard input mode, as illustrated in FIG. 5A, the counted input time period is shorter than a minimum input time period corresponding to the length of the stroke in the keyboard input mode, and hence, the input mode determination unit 34 determines that key entry has been performed.

Figure 5B:
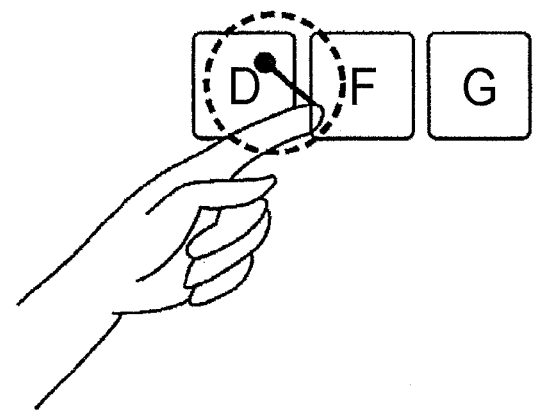
FIG. 5B is a stroke of a finger drawing a line in a handwritten input mode.

When handwritten input has been performed as illustrated in FIG. 5B, the counted input time period is equal to or longer than the minimum input time period corresponding to the length of the stroke in the keyboard input operation mode, and hence, the input mode determination unit 34 determines that handwritten input has been performed.

The information processing apparatus 10 also includes a handwriting input unit 36, a character recognition unit 38, a key recognition unit 40, and a key entry unit 42. Incidentally, the handwriting input unit 36 and the character recognition unit 38 are examples of a handwritten input processing unit, the key recognition unit 40 is an example of an operation selection unit. The key entry unit 42 is an example of an operation input processing unit.

Incidentally, the function of the handwritten input processing unit is not limited to character recognition. The handwritten input processing unit may use software for editing and saving an image data such as drawings on a memorandum.

In addition, the function of the operation selection unit is not limited to key recognition. The operation selection unit may recognize an icon on a screen or an image on a Web browser screen which are touched by a user, or may select an input area or may execute operation of software by marking a check box, pushing a radio button and list box, and the like. The operation input processing unit may execute software under instruction of an icon or under instruction of an image displayed in a Web browser or may execute jumping of a Web page. In addition, the operation input processing unit may move a focus to an input area displayed in a Web browser or may execute a process of operating a software component.

When the input mode determination unit 34 has determined that handwritten input has been performed, the handwriting input unit 36 acquires coordinate data of the written stroke, which are stored in the stroke image memory 28, and outputs the information to the character recognition unit 38 so as to be recognized as a character written by hand.

The character recognition unit 38 includes a dictionary database for character recognition and performs character recognition on the input stroke output from the handwriting input unit 36.

When the input mode determination unit 34 has determined that key entry has been performed, the key recognition unit 40 compares the coordinates data stored in the stroke image memory 28 with the position of each key icon displayed on the touch panel display 20 to recognize a key being selected. An existing method may be used to select the key concerned. The key recognition unit 40 determines that which key icon area includes or is closest to the end points of the stroke, the central point of a circumscribed rectangle of the stroke, and the like. Then the recognition unit can recognize a selected key.

The key entry unit 42 executes a process corresponding to the key recognized by the key recognition unit 40. For example, the key entry unit 42 executes a process of accepting a character corresponding to the selected key as input.

Next, operation of a first embodiment will be described.

Figure 6:
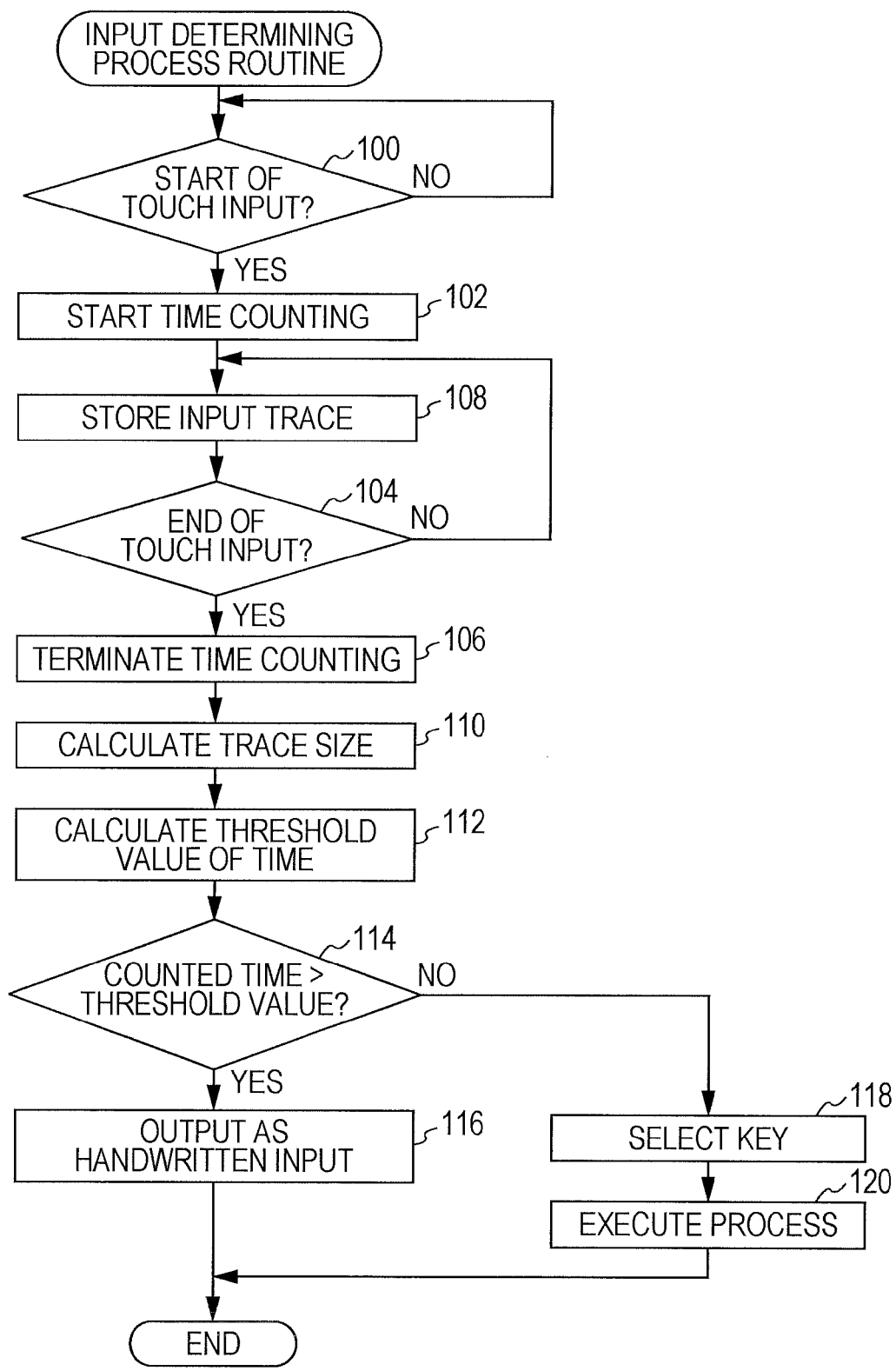
FIG. 6 is a flowchart illustrating a mode determining process of the information processing apparatus according to the first embodiment.
Figure 7:
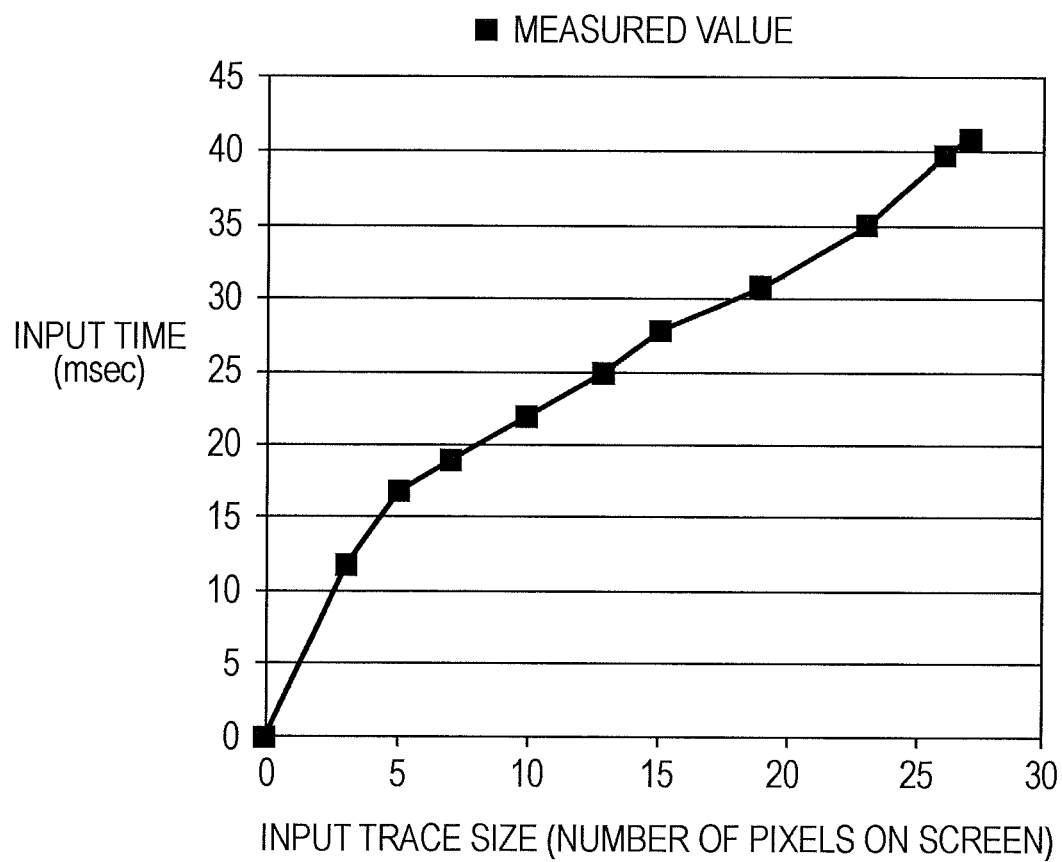
FIG. 7 is a graph illustrating a relationship between the length of a stroke and the minimum time period of writing.

An input determining process illustrated in FIG. 6 is executed by a CPU 12 of an information processing apparatus 10 when the processing apparatus 10 is displaying a software keyboard on a touch panel display 20.

The CPU 12 determines whether or not input of coordinates data of a touched point, or touching, on the touch panel display 20 has been started in step 100. When input of the coordinate data has been started, the process proceeds to step 102 and the CPU 12 starts measuring of the elapsed time. Then, the CPU 12 determines whether or not the touching on the touch panel display 20 has been terminated in step 104. When the touching has been terminated, the process proceeds to step 106 and the CPU 12 stops timer that has measured the elapsed time, and the CPU calculates the time period, which starts at step 102.

The CPU 12 stores coordinate data of the written stroke on the touch panel display 20 in a stroke image memory 28 in step 108. Then, the CPU 12 calculates the length of a stroke based on the coordinate data stored in the stroke image memory 28 in step 110.

In step 112, the CPU 12 calculates a threshold value of input time period corresponding to the length of the stroke, which has been calculated in step 110. this calculation is conducted on the basis of a previously obtained relationship between the length of the stroke and the minimum time period of writing. Then, in step 114, CPU 12 determines whether or not the input time period measured in step 110 is equal to or more than the threshold value calculated in step 112.

When the counted input time period is equal to or more than the threshold value, the input through the touch panel display 20 is determined as a handwritten input, and the CPU 12 outputs the coordinate data, which are information on the stroke and stored in the stroke image memory 28, to the character recognition unit 38 in step 116. Then, the CPU 12 terminates execution of the input determining process.

When the counted input time period is less than the threshold value, the input through the touch panel display 20 is determined as a key entry and the process proceeds to step 118. In step 118, the CPU 12 compares the coordinate data stored in the stroke image memory 28 with the coordinate data of each key icon displayed on a screen and then, the CPU 12 recognizes the key icon selected by a user. Then, the CPU 12 executes a process corresponding to the operation of the key selected in step 118 and terminates execution of the input determining process in step 120.

The information processing apparatus 10 according to the first embodiment calculates the length of the stroke marked on the touch panel display as described above. Next, the information processing apparatus 10 calculates the minimum input time period, which is a threshold value, corresponding to the calculated length of the stroke on the basis of a relationship between the stroke length and the minimum input time period in handwritten input. Then, the information processing apparatus 10 compares the measured input time period with the threshold value to determine whether the input performed by touching the touch panel display is handwritten input or key entry. Thus, the information processing apparatus 10 can determine correctly whether the input mode is a handwritten input mode or a key entry mode.

Then, the information processing apparatus 10 performs linear interpolation on the minimum input time period in handwritten input which has been obtained for every length of the stroke to obtain a corresponding relation between length of the stroke and minimum input time period thereof in handwritten input. As a result, the information processing apparatus 10 can calculate a minimum input time period in handwritten input as a threshold value, corresponding to any length of a stroke.

Although an example in which the stroke length calculator 30 obtains the total length of the stroke has been explained in this embodiment, it is not limited to the above. For example, the stroke length calculator 30 may obtain the sum of the area of a circumscribed rectangle of a stroke, the length of the long side of the circumscribed rectangle or the sum of height and width of the circumscribed rectangle in stead of the stroke length.

Although, in the above example, the information processing apparatus 10 obtains the relationship between length of a stroke and input time period in handwritten input mode on the basis of measured time period, it is not limited to this. For example, the information processing apparatus 10 may obtain the relationship based on estimated time period.

In addition, in the above example, the information processing apparatus 10 obtains the relationship between length of a stroke and minimum input time period in handwritten input mode by performing linear interpolation by connecting the adjacent plots with a straight line. However, it is not limited to the above. For example, the information processing apparatus 10 may obtain the relationship in handwritten input mode by performing curve interpolation by connecting adjacent plots. The information processing apparatus 10 may use known methods such as spline interpolation and Bezier curve interpolation as a method of curve interpolation.

Next, a second embodiment will be described. Since the configuration of an information processing apparatus according to the second embodiment is the same as that of the apparatus according to the first embodiment, the same numerals are assigned to the same parts and description on the configuration will be omitted.

The second embodiment is different from the first embodiment in a manner of obtaining the relationship between lengths of the stroke and minimum input time periods thereof in handwritten input.

The method in the second embodiment of obtaining the relationship is described as follows.

First, a user writes many strokes such as characters by handwriting on the touch panel display 20, and the information processing apparatus 10 collects input time periods data for lengths of the strokes. The information processing apparatus 10 obtains a minimum value of the input time period data for every length of the stroke.

Figure 8:
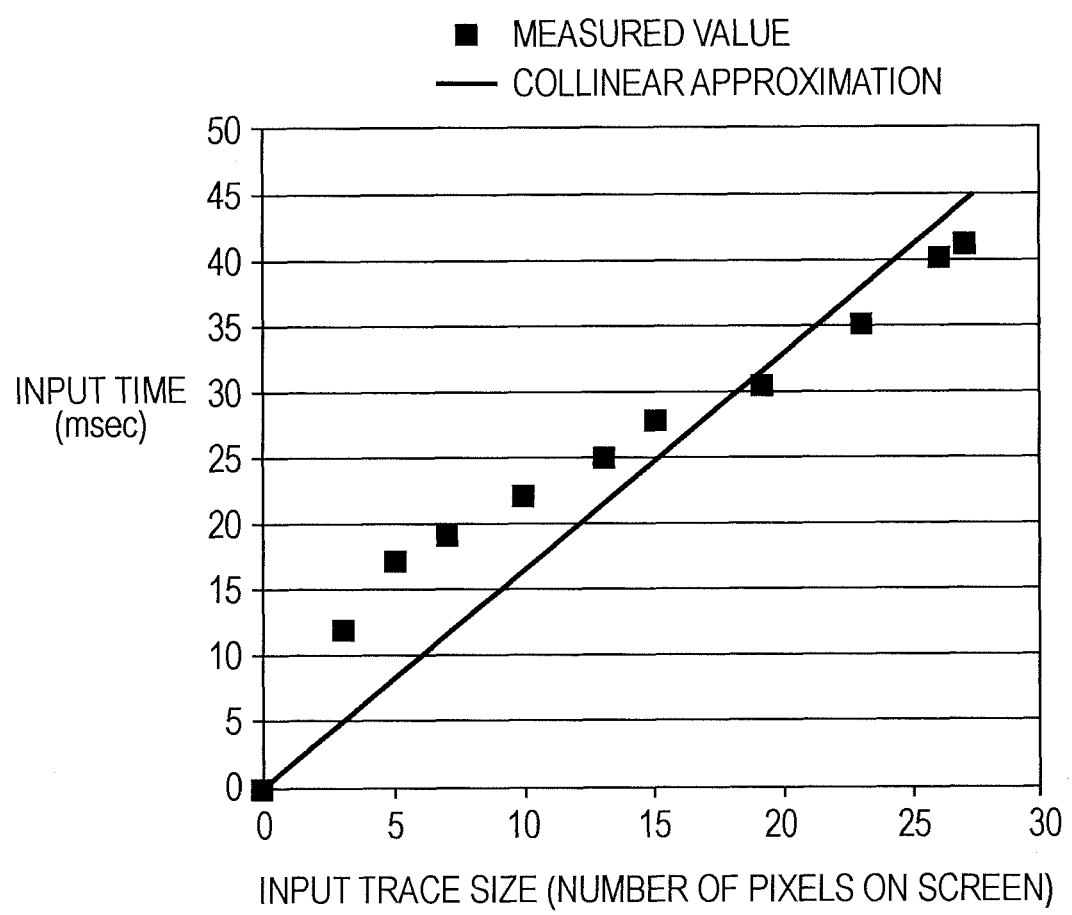
FIG. 8 is a graph illustrating a relationship between the length of a stroke and the minimum time period of writing.

Next, the information processing apparatus 10 performs linear approximation on measured values using the least squares method as illustrated in FIG. 8. For example, a coefficient "a" of a linear equation expressed by "y=ax" is determined by the least squares method as follows; distances between the line "y=ax" and measured plots are squared; the squares are summed up; and then, the coefficient "a" is determined such that the summed up value becomes to the least value. A linear approximation can be available based on the calculated coefficient "a." When the coefficient "a" of a linear equation "y=ax" is determined on the basis of the plots illustrated in FIG. 8, obtained is the following linear equation that represents the relationship between length of the stroke and minimum input time period thereof in handwritten input.

$$y=1.657381616x$$

In the expression, x is a length of the stroke, and y is a minimum input time period in handwritten input.

Incidentally, since the other configurations and operations of the information processing apparatus 10 according to the second embodiment are the same as those of the apparatus according to the first embodiment, description thereof will be omitted.

Figure 9:
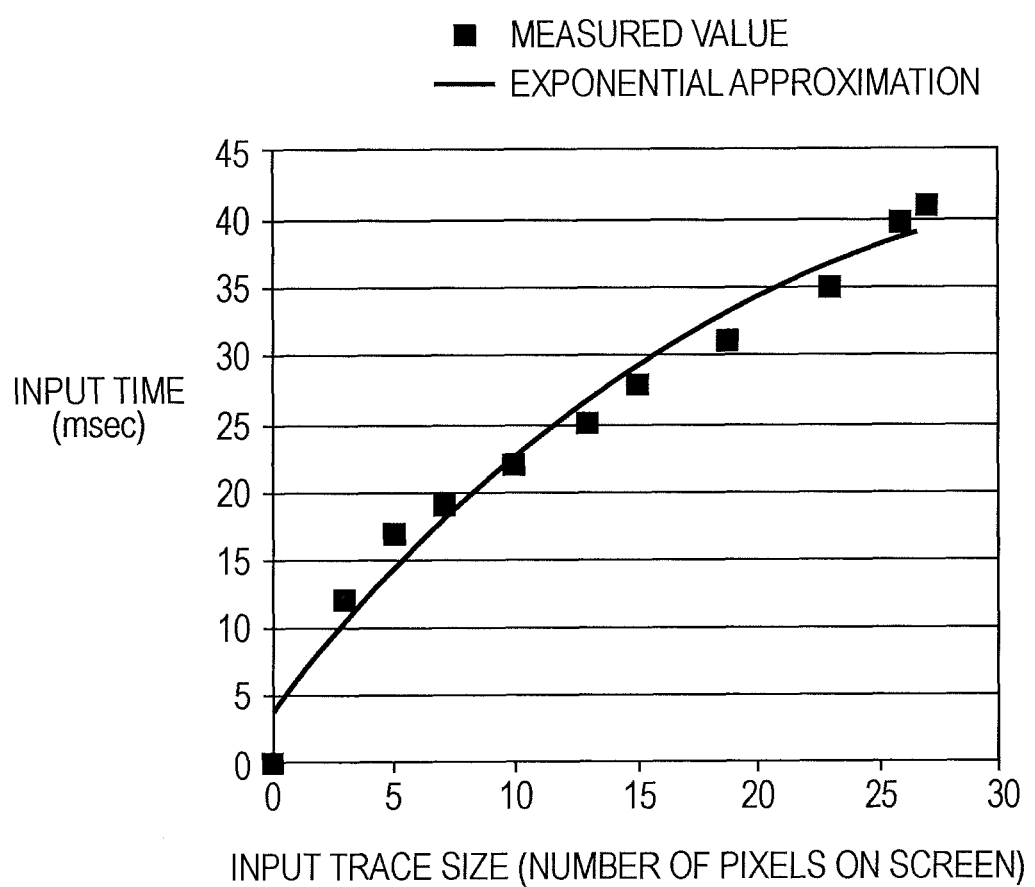
FIG. 9 is a graph illustrating a relationship between the length of a stroke and the minimum time period of writing.

In the second embodiment, the information processing apparatus 10 performs linear approximation on the measured value by the least squares method, however, it is not limited to the linear approximation. The information processing apparatus 10 may perform exponential curve approximation on the measured value by the least squares method. For example, coefficients "a", "b", and "c" of an exponential function expressed by "y=ae$^{bx}$+c" are determined by the least squares method as follows; distances between the curve "y=ae$^{bx}$+c" and measured plots are squared; the squares are summed up; and then, the coefficients "a", "b", and "c" are determined such that the summed up value becomes to the least value. The example illustrated in FIG. 9 is an approximation based on the exponential curve and values measured by the information processing apparatus 10. In FIG. 9, the exponential function is determined as follows:

$$y=-47.7879\exp(-0.05227x)+50.81237$$

It may be desirable to perform approximation by the least squares method by limiting such that the coefficient "a" and "b" has a negative value as expressed above. Since the information processing apparatus 10 approximates the measured value with the curve expressed by the exponential function, when a stroke is longer than the maximum measured value, the threshold value changes only slightly. Therefore, the value corresponding to such a long stroke causes few erroneous determinations.

Figure 10:
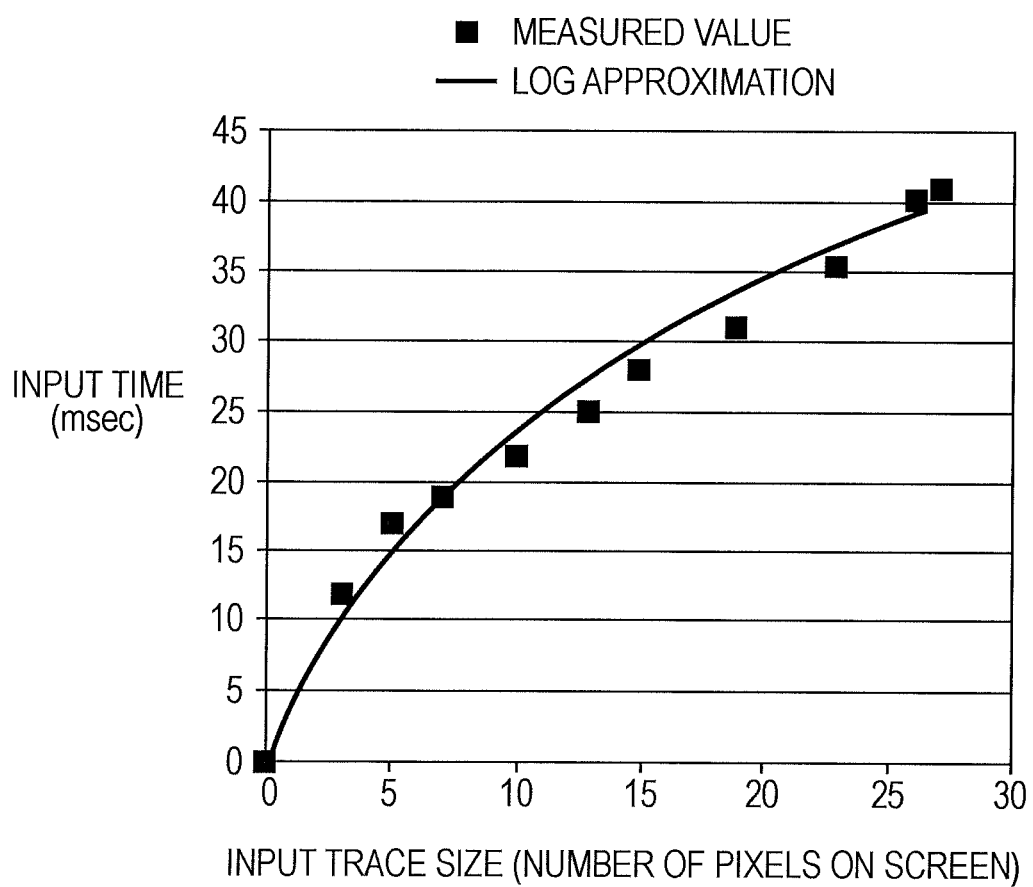
FIG. 10 is a graph illustrating a relationship between the length of a stroke and the minimum time period of writing.

In addition, the information processing apparatus 10 may perform logarithmic curve approximation on the measured value by the least squares method. For example, coefficients "a", "b", and "c" of a logarithmic function expressed by "y=a log(bx+1)+c" are determined by the least squares method as follows; distances between the curve "y=a log(bx+1)+c" and measured plots are squared; the squares are summed up; and then, the coefficients "a", "b", and "c" are determined such that the summed up value becomes to the least value. The example illustrated in FIG. 10 is an approximation based on the logarithmic curve and values measured by the information processing apparatus 10. In FIG. 10, the logarithmic function is determined as follows:

$$y=21.74556 \log(0.172067x+1)+1.293963$$

Since the information processing apparatus 10 approximates the measured value with the curve expressed by the logarithmic function, when a stroke is longer than the maximum measured value, the threshold value changes only slightly. Therefore, the value corresponding to such a long stroke causes few erroneous determinations.

Furthermore, the information processing apparatus 10 may divide a stroke into a plurality of sections and may perform linear approximation or curve approximation based on the state of each section. For example, the information processing apparatus 10 may divide a stroke into a plurality of sections with the same length. In the above mentioned case, the information processing apparatus 10 may determine the length of the sections in accordance with an interval at which discretely measured values of the stroke length are obtained. In addition, the information processing apparatus 10 may perform linear approximation or curve approximation on each section of the stroke while gradually increasing the each length thereof, and then may determine a maximum length of the sections such that an approximation error between measured value and the given curve becomes smaller than a predetermined value.

In addition, the information processing apparatus 10 may divide a stroke into a plurality of sections based on the stroke lengths, which are discretely measured in advance.

Next, a third embodiment will be described. Since the configuration of an information processing apparatus according to the third embodiment is the same as that of the apparatus according to the first embodiment, the same numerals are assigned to the same parts and description thereof will omitted.

The third embodiment is different from the first embodiment in a manner of obtaining each length of the stroke.

In the third embodiment, the stroke length calculator 30 weights a length of a segment formed by adjacent measured points using a coordinate data stored in the stroke image memory 28. Each segment is weighed based on its length and an angle formed between adjacent segments. The stroke length calculator 30 calculates the total weighted value of the length of the stroke.

For example, the stroke length calculator 30 multiplies the length data of the segment, which is a distance between the coordinate points. The weighting is conducted using a scale factor that is defined for eight directions as illustrated in FIG. 11. If a weighting factor (a scale factor) is increased, the calculated length of the stroke will be increased and the stroke will be easily determined as handwritten input. When a character is input by handwriting, the direction of segment is downward or rightward in many cases and upward or leftward in very few cases. Therefore, the stroke length calculator 30 can increase its accuracy in determination by highly weighting to the segment directing upward or leftward illustrated in FIG. 11, when a character is input by handwriting.

When a finger runs off during a key entry, the path of the finger may be a straight line in many cases in stead of a curved line. Therefore, it may be better to make a curved long stroke be easily determined as a handwritten input.

Thus, the stroke length calculator 30 calculates a difference in direction between two vectors; a first vector having a point of interest as an end point and a second vector having the same point as a start point. When the difference in the directions is equal to or more than a constant value, the stroke length calculator 30 highly weights the second vector. For example, if a difference in angle between the two directions of vectors is equal to or more than 45 degrees, the calculator 30 will double the length of the second vector. If the difference in angle between the two directions is less than a constant value, the calculator 30 will not weight the length.

The stroke length calculator 30 weights the length of distance between the coordinate points of the input stroke and calculates the total value of the weighted lengths as the length of the stroke as described above.

According to the information processing apparatus of the third embodiment, when an input stroke has a shape which would be hardly formed by side slipping of a quick touch which would occur when quickly depressing a plurality of keys such as, for example, a non-linear and complicated shape, it is more apt to be determined as handwritten input as described above. When an input stroke has a shape which would be hardly formed by handwritten input such as an upward directing straight line, the information processing apparatus may obtain the data of the stroke length with which it would be hardly determined as handwritten input.

In the above embodiment, the stroke length calculator 30 multiples the length of distance between the coordinate points of the stroke by the weighting factor has been described, however, it is not limited to the above. The stroke length calculator 30 may add a weighting factor to the length of distance between the coordinate points of the.

In the above embodiment, the stroke length calculator 30 weights each length of distance between the coordinate points of the stroke has been described, however, it is not limited to the above. The calculator 30 may extract characteristic points from the stroke and may weight each length of distance between the characteristic points. According to the above, it may become possible to remove sampling noise from the touch panel display 20. The calculator 30 may use a known method to extract characteristic points. For example, the calculator 30 may extract the characteristic points from the stroke as described hereinbelow. A case in which sampling points of a stroke have been obtained as points 1 to 5 as illustrated in FIG. 12A will be described.

First, the stroke length calculator 30 selects a start point of a stroke as a characteristic point 1 and connects the point 1 to a point "i". Next, the calculator 30 calculates distances between other sampling points and the line connecting point 1 and point "i". Then, the calculator 30 determines the maximum distance "di" among the calculated distances. In the example illustrated in FIG. 12A, the calculator 30 connects the points 1 and 4 with a straight line and calculates the distance between the point 2 and the line and between the point 3 and the line. The calculator 30 determines that the maximum distance is "d4". The distance value "di" indicates how much the stroke starting from the point 1 to the point "i" deviates from the straight line. If the calculator 30 has found a point "j" where the value "di" is equal to or more than a threshold "D" of the distances, the calculator 30 selects the point "j–1" as a next characteristic point. Since j=5 in the example in FIG. 12B, the calculator 30 sets the point 4 as a next characteristic point. The calculator 30 repeats the same processing by selecting the next characteristic point as a start point. When the calculation by the calculator 30 reaches the end point of the stroke, it terminates extraction of the characteristic points. Incidentally, the end point is also regarded as one of the characteristic points.

As described above, the stroke length calculator 30 extracts the characteristic points from the input stroke. The threshold value "D" is a constant. As the threshold value "D" is larger, noises may be more easily removed, but the characteristic of the stroke may be lost.

In the first to third embodiments, the information processing apparatus 10 obtains a threshold time based on the length of an input stroke and determines whether the input mode is a handwritten input mode or a key entry mode. However, it is not limited to the above. The image processing apparatus 10 may collect the length data of a stroke for the input time periods and may calculate a threshold value of the stroke length on the basis of the input time periods of the stroke. For example, the coefficient "a" of the straight line "x=ay" may be calculated by the above least squares method.

Figure 14:
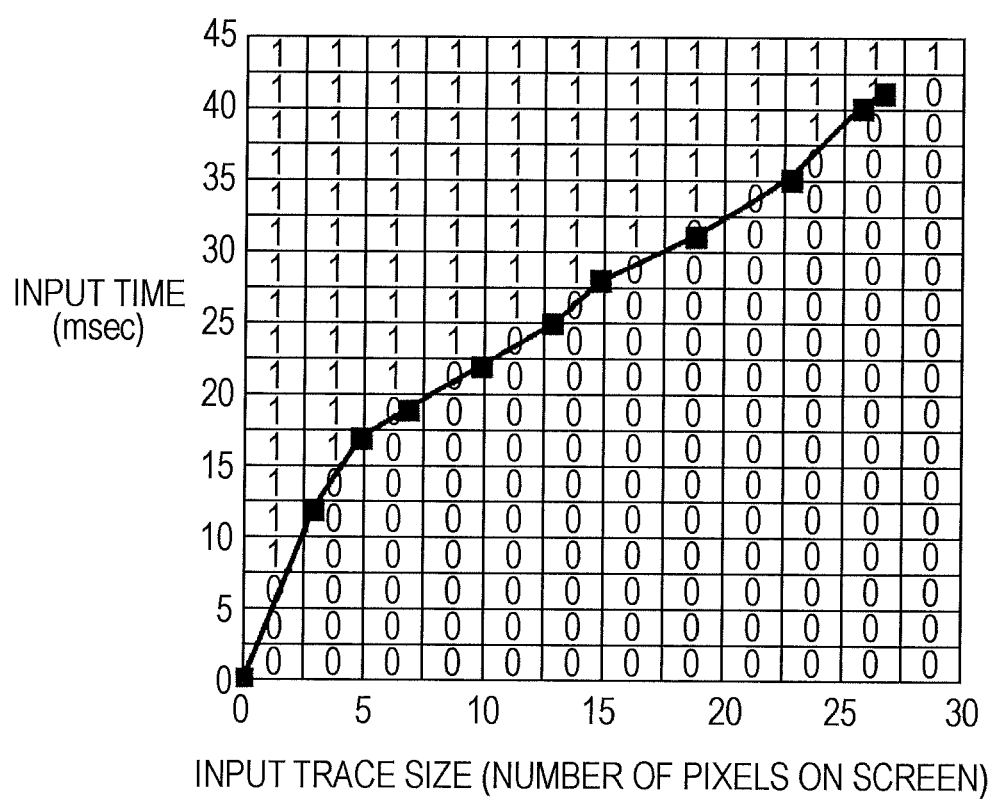
FIG. 14 is a threshold value table that is referred to by a threshold value calculation unit.

Although the examples of obtaining the threshold value by linear approximation or curve approximation have been described in the above first to third embodiments, it is not limited to the above. FIG. 14 is a threshold value table that is referred to by a threshold value calculation unit. For example, the threshold value may be obtained from the table illustrated in FIG. 14 without calculating. The table contains information obtained from measured values and describes a relationship between input time periods and length of a stroke. For example, when a stroke has a length of 5 pixels and the input time period is 30 ms, 1 (one) is obtained with reference to the table of FIG. 14 and hence the input mode is determined to be a handwritten input mode. When a stroke has a length of 5 pixels and the input time period is 5 ms, 0 (zero) is obtained with reference to the table in FIG. 14 and hence the input mode is determined to be a key entry mode. Although the table illustrated in FIG. 14 is prepared in units of several pixels, the table may be prepared in units of one pixel. Likewise, although the table illustrated in FIG. 14 is prepared in units of several milliseconds, the table may be prepared in units of one millisecond.

In the above first to third embodiments, described is the information processing apparatus 10 determines a relationship between length of a stroke and a minimum input time period in a handwritten input mode, however, it is not limited to the above. The information processing apparatus 10 may determine a relationship between length of a stroke and a maximum input time periods in a key entry mode. In the above mentioned case, the relationship between lengths of the stroke and maximum input time periods in a key entry mode is determined as described hereinbelow.

First, a user actually performs key entry on a touch panel display 20 and the information processing apparatus 10 collects input time periods for lengths of a stroke. The information processing apparatus 10 calculates a maximum value of the input time period for every length of the stroke on the basis of the collected input time periods for lengths of the stroke. The information processing apparatus 10 determine the relationship between lengths of the stroke and maximum input time periods in a key entry mode on the basis of the maximum values of the input time periods obtained for every length of the stroke. The time period calculator 32 calculates the maximum time period for a key entry on the basis of a previously obtained relationship between the length of the stroke, whose length is calculated by the stroke length calculator 30, and the maximum time period of key entry. The calculated maximum time is used as the threshold value.

The information processing apparatus 10 determines a relationship between lengths of strokes and maximum input time periods in key entry through linear interpolation, curve interpolation, linear approximation or curve approximation on the data of the maximum input time periods of each key entry corresponding to each stroke. According to the above, the information processing apparatus 10 can calculate a maximum input time period in key entry as a threshold value, corresponding to any length of a stroke.

In this case, described is the information processing apparatus 10 collects data of input time periods corresponding to lengths of the stroke in a handwritten input mode, and determines the minimum value of the input time periods for every length of the stroke, however, it is not limited to the above. The information processing apparatus 10 may collect data of the input time periods corresponding to respective lengths of the stroke in a key entry mode while the apparatus 10 collects data of the input time periods corresponding to respective lengths of the stroke written in a handwritten input mode, thereby a minimum value of the input time periods are determined for every length of the stroke. In this case, the information processing apparatus 10 determines the center of a region which is included in both of an input time period in a handwritten input mode and an input time period in a key entry input mode for every length of a stroke. The input time period corresponding to the obtained center is determined as a minimum value of the input time period in a handwritten input mode. As an alternative, the information processing apparatus 10 may determine a normal distribution of collected input time periods in a handwritten input mode and a normal distribution of collected input time periods in a key entry mode for every length of a stroke and set an input time period corresponding to a point where the both normal distribution lines intersect as a minimum value of the input time periods in a handwritten input mode.

The information processing apparatus 10 is not limited by any hardware mechanism. For example, the display may be of an organic EL type or a liquid crystal type and has only to have a resolution enough to display a software keyboard and a stroke written by hand. In addition, the touch panel may be of a capacitance type, an optical type, or an electromagnetic induction type and any panel may be adopted as long as it has a sampling rate and a resolution which are enough to touch or handwritten input to the software keyboard.

In addition, the information processing apparatus 10 is of the type that input is made by touching a touch panel display has been described, however, it is not limited to the above. The information processing apparatus 10 may use any pointing device such as a mouse, a track ball and object tracking device that is used in real time analysis of an image taken by a camera system. When a mouse or a track ball is used as the pointing input unit 24, it accepts input data of coordinates while a button is being pushed. When an object tracking device is used as the pointing input unit 24, it detects some action similar to an operation of pushing a button, for example, an operation of a button if the object tracking device has a button or an operation of pushing the object forward. Then, the pointing input unit 24 accepts input of coordinate data corresponding to the detected action.

In addition, in the embodiments, characters are input into the information processing apparatus 10 by handwritten input, however, it is not limited to the above. Symbols and graphics may be input into the information processing apparatus 10 by handwritten input.

Figure 13:
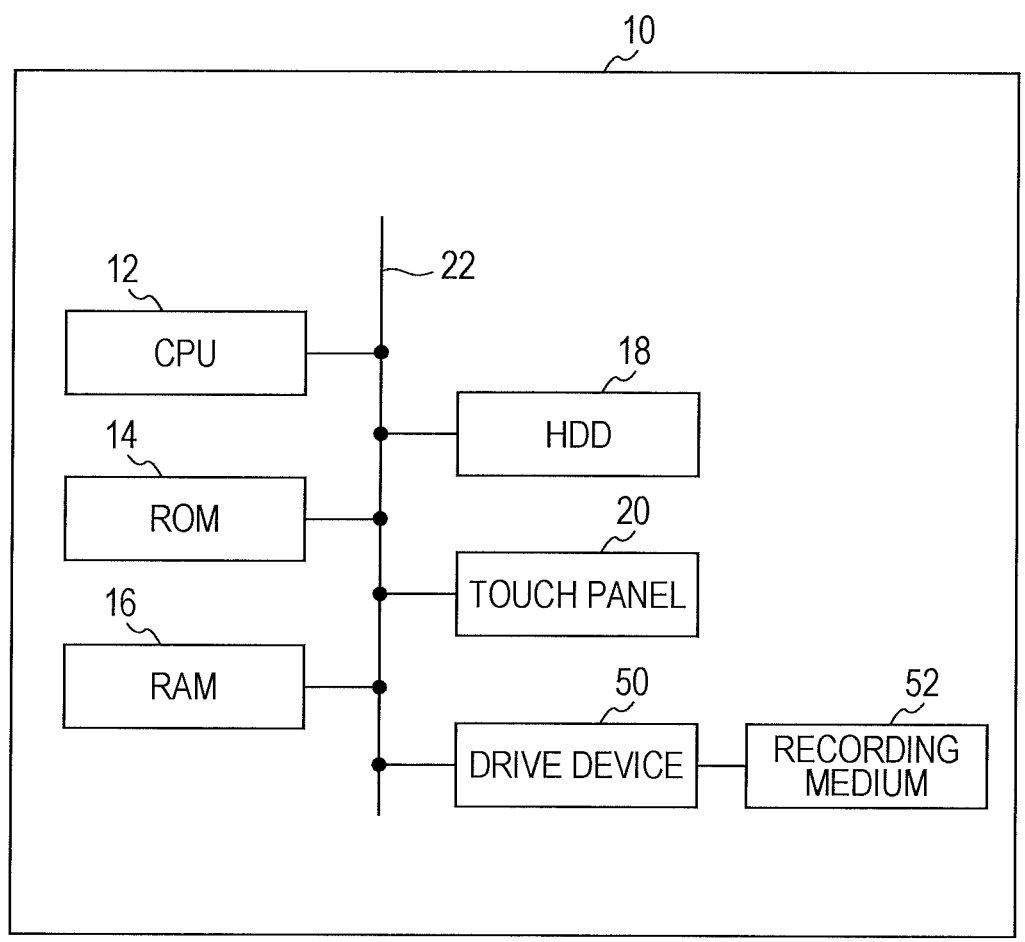
FIG. 13 is a schematic diagram illustrating a configuration of an information processing apparatus in which a recording medium is loaded into an HDD to transfer a program stored in the medium.

Further, in the embodiments, the program for executing the input determining process is stored in the HDD 18, however, it may be possible to provide the program that is stored in a portable recording medium such as a CD-ROM, a DVD-ROM, or a USB memory. For example, as illustrated in FIG. 13, the recording medium 52 containing the program for executing the input determining process, such as a CD-ROM, a DVD-ROM or a USB memory, is loaded into the driver 50 of the information processing apparatus 10. Then, the program for executing the input determining process is transferred from the recording medium 52 into the HDD 18 via the driver 50.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing apparatus comprising:
a memory; and
a processor coupled to the memory and configured to:

display a keyboard including a plurality of operation areas to be touched on a screen of a display, receive position information of a plurality of touch points within the keyboard on the screen, the plurality of touch points including a first touch point and a second touch point, as a stroke which is an unbroken line from the first touch point to the second touch point detected within the keyboard on the screen, the first touch point being located at a first position within the keyboard on the screen, and the second touch point being located at a second position within the keyboard on the screen different from the first position within the keyboard on the screen, execute a calculation of a size of the stroke from the first touch point to the second touch point, measure a time period for the stroke, the time period starting at a first time when the processor receives first position information corresponding to the first position, and the time period terminating at a second time when the processor receives second position information corresponding to the second position different from the first position, and determine whether the position information is input by a sliding operation on the keyboard or by a touch operation for the plurality of operation areas in the keyboard on basis of both the calculated size of the stroke and the measured time period.

2. The information processing apparatus according to claim 1, wherein the processor is configured to:

access reference relationship information between a length of a stroke including a plurality of touch points within the keyboard on the screen of the display and a time period for a stroke;

set a threshold value on basis of the reference relationship information for the measured time period corresponding to the size of the stroke calculated; and compare the time period measured for the stroke with the set threshold value to determine that the position information is input by the sliding operation on the keyboard when the time period measured is longer than the set threshold value and to determine that the position information is input by the touch operation for the plurality of operation areas in the keyboard when the time period measured is shorter than the set threshold value.

3. The information processing apparatus according to claim 2, wherein the reference relationship information is obtained by any one of linear approximation, linear interpolation, curve approximation or curve interpolation, on a plurality of minimum values, a minimum value being a minimum time period among a plurality of time periods measured in advance for a size of a stroke in which position information of touch points is input by a sliding operation on a displayed keyboard.

4. The information processing apparatus according to claim 3, wherein the reference relationship information is obtained by any one of linear approximation or curve approximation on a minimum value for a section of a range of sizes of a stroke.

5. The information processing apparatus according to claim 3, wherein the reference relationship information is obtained by approximating the minimum value with a logarithmic function.

6. The information processing apparatus according to claim 3, wherein the reference relationship information is obtained by approximating the minimum value with an exponential function.

7. The information processing apparatus according to claim 2, wherein the reference relationship information is obtained by any one of linear approximation, linear interpolation, curve approximation and curve interpolation, on a plurality of maximum values, a maximum value being a maximum time period among a plurality of time periods measured in advance for a size of a stroke in which position information of touch points including first and second touch points is input by a touch operation for a plurality of operation areas in a displayed keyboard.

8. The information processing apparatus according to claim 1, wherein the calculation includes calculating a total size for the stroke.

9. The information processing apparatus according to claim 1, wherein the calculation includes calculating an area of a rectangle circumscribing the stroke or a length of a long side of the rectangle.

10. The information processing apparatus according to claim 1, wherein the calculation includes:

calculating a plurality of sizes for the stroke including the first and second touch points, a size of the stroke obtained by weighting a length of a part of a stroke in accordance with a progressing direction of the part or a change in the progressing direction.

11. The information processing apparatus according to claim 1, wherein the processor is configured to:

store the position information received;

execute a given process using the stored position information when determined that the position information is be input by the sliding operation on the keyboard;

select an operation area among the plurality of operation areas in the keyboard on basis of the stored position information when determined that the position information is input by the touch operation for the plurality of operation areas in the keyboard and execute a given process corresponding to the selected operation area.

12. The information processing apparatus according to claim 1, wherein the processor is configured to:

determine a threshold value on a basis of the calculated size of the stroke; and compare the measured time period for drawing the stroke with the determined threshold value to determine whether the position information is input by the sliding operation or by the touch operation for the plurality of operation areas in the keyboard.

13. The information processing apparatus according to claim 1, wherein the processor is configured to:

determine a threshold value on a basis of the measured time period for drawing the stroke; and compare the calculated size of the stroke with the determined threshold value to determine whether the position information is input by the sliding operation or by the touch operation for the plurality of operation areas in the keyboard.

14. The information processing apparatus according claim 1, wherein the first touch point is a starting point of the stroke and the second touch point is an end point of the stroke.

15. The information processing apparatus according to claim 1, wherein the processor is configured to:

execute a character recognition on basis of the stroke when it is determined that the position information is input by the sliding operation on the keyboard.

16. A method of processing information for a screen of a display comprising:

displaying a keyboard including a plurality of operation areas to be touched on the screen;

receiving position information of a plurality of touch points within the keyboard on the screen, the plurality of touch points including a first touch point and a second touch point, as a stroke which is an unbroken line from the first touch point to the second touch point detected on within the keyboard on the screen, the first touch point being located at a first position within the keyboard on the screen, and the second touch point being located at a second position within the keyboard on the screen different from the first position within the keyboard on the screen;

calculating a size of the stroke from the first touch point to the second touch point;

measuring a time period for the stroke, the time period starting at a first time when first position information corresponding to the first position is received, and the time period terminating at a second time when second position information corresponding to the second position different from the first position is received; and determining whether the position information is input by a sliding operation on the keyboard or by an touch operation for the plurality of operation areas in the keyboard on the screen on basis of both the calculated size of the stroke and the measured time period for drawing the stroke.

17. The method according claim 16, wherein
the first touch point is a starting point of the stroke and the second touch point is an end point of the stroke.

18. The method according to claim 16, further comprising:
executing a character recognition on basis of the stroke when it is determined that the position information is input by the sliding operation on the keyboard.

19. A non-transitory computer readable recording medium for causing a computer to execute a process for a screen of a display, the process including:

displaying a keyboard including a plurality of operation areas to be touched on the screen;

receiving position information of a plurality of touch points within the keyboard on the screen, the plurality of touch points including a first touch point and a second touch point, as a stroke which is an unbroken line from the first touch point to the second touch point detected e-n within the keyboard on the screen, the first touch point being located at a first position within the keyboard on the screen, and the second touch point being located at a second position within the keyboard on the screen different from the first position within the keyboard on the screen;

calculating a size of the stroke from the first touch point to the second touch point;

measuring a time period for the stroke, the time period starting at a first time when first position information corresponding to the first position is received, and the time period terminating at a second time when second position information corresponding to the second position different from the first position is received; and determining whether the position information is input by a sliding operation on the keyboard or by an touch operation for the plurality of operation areas in the keyboard on the screen on basis of both the calculated size of the stroke and the measured time period for drawing the stroke.

20. The non-transitory computer readable recording medium according claim 19, wherein the first touch point is a starting point of the stroke and the second touch point is an end point of the stroke.

* * * * *

UNITED STATES PATENT AND TRADEMARK OFFICE
CERTIFICATE OF CORRECTION

PATENT NO. : 9,098,184 B2
APPLICATION NO. : 13/326430
DATED : August 4, 2015
INVENTOR(S) : Katsuhiko Akiyama Page 1 of 1

It is certified that error appears in the above-identified patent and that said Letters Patent is hereby corrected as shown below:

In the claims,

Claim 14, Column 14, Line 57

Delete "according claim" and insert --according to claim--, therefor.

Claim 16, Column 15, Line 7

After "detected" delete "on".

Claim 17, Column 15, Line 28

Delete "according claim" and insert --according to claim--, therefor.

Claim 19, Column 16, Line 10

After "detected" delete "e-n".

Claim 20, Column 16, Line 32

Delete "according claim" and insert --according to claim--, therefor.

Signed and Sealed this
Twenty-fourth Day of November, 2015

Michelle K. Lee
*Director of the United States Patent and Trademark Office*